United States Patent [19]

Tsuruta et al.

[11] Patent Number: 5,299,012
[45] Date of Patent: Mar. 29, 1994

[54] SWITCHING MECHANISM FOR VIDEO LIGHTING APPARATUS

[76] Inventors: Yuzo Tsuruta, 2-23-9, Azamino, Midori-Ku, Yokohama City, Kanagawa Pref., 225; Kohichi Matsuki, 2-14-17-201 Mure, Mitaka City, Tokyo 181, both of Japan

[21] Appl. No.: 26,267

[22] Filed: Mar. 4, 1993

Related U.S. Application Data

[63] Continuation of Ser. No. 601,209, Oct. 19, 1990, abandoned, which is a continuation-in-part of Ser. No. 430,528, Nov. 1, 1989, abandoned.

[51] Int. Cl.$^5$ .............................................. H04H 5/30
[52] U.S. Cl. ...................................... 348/370; 348/372; 354/129
[58] Field of Search ............... 358/185, 209, 909, 228, 358/229; 315/159, 208, 362; 354/129, 137, 145.1

[56] References Cited

U.S. PATENT DOCUMENTS

| | | | |
|---|---|---|---|
| 4,027,334 | 5/1977 | Grant | 358/210 |
| 4,881,128 | 11/1989 | Yamada | 358/228 |
| 5,062,010 | 10/1991 | Saito | 360/35.1 |

Primary Examiner—Michael T. Razavi
Assistant Examiner—Tuan V. Ho
Attorney, Agent, or Firm—Rockey, Rifkin and Ryther

[57] ABSTRACT

Switching circuits are disclosed which activate lighting in conjunction with the operation of a video recorder. The switching circuits employ signalling means such as relays, photo emitters or transistors to detect current flow in the video recorder motor circuit. Circuit elements receive the signal and activate a light. If the motor circuit is inoperative, the light remains off.

5 Claims, 5 Drawing Sheets

SWITCHING MECHANISM FOR VIDEO LIGHTING APPARATUS

This is a continuation of copending application Ser. No. 07/601,209 filed on Oct. 19, 1990 now abandoned, which is a continuation-in-part of application Ser. No. 07/430,528, filed Nov. 1, 1989, now abandoned.

The present invention relates to a novel switching mechanism for a lighting apparatus used with video cameras.

BACKGROUND OF THE INVENTION

Video cameras have recently enjoyed increasing popularity throughout the world. This is particularly true of small, hand-held video cameras designed for use by amateurs in the home, and also employed by professional and semi-professional photographers in non-studio locations. In these environments, available ambient lighting must often be supplemented by additional lighting in order to successfully record an image on video tape. Inferior lighting conditions often result in poor color fidelity and indistinct recorded images.

To reduce these problems, lighting devices have been designed to operate with said video cameras to provide additional lighting, thereby permitting superior videotape image quality. Such devices are typified by separate lighting units that are manually switched by the video camera operator prior to the start of taping. Because such devices are manually switched, they usually remain on until after taping is completed, creating a hazard resulting from the heat generated by such devices. In addition, in remote locations, such devices are often powered by battery, and the waste of power supplied to such lighting units before and after the actual camera operation presents a substantial problem.

Such devices also present the problem that the video camera operator may fail to operate the lighting unit prior to the start of taping, thus defeating the entire purpose of providing supplemental lighting to enhance image quality.

SUMMARY OF THE INVENTION

The present invention comprises a switching mechanism for a video lighting apparatus, wherein the lighting apparatus operates in response to a signal generated by a video camera upon the operation of the video camera. Thus, the lighting apparatus provides light only for the periods needed, i.e., during the actual camera operation.

According to the present invention, a switching mechanism for a video lighting apparatus is provided, comprising signalling means activated by operation of a video camera operation switch, and, receiving means for activating a lighting apparatus upon receiving a signal generated by said signalling means.

It is thus an object of the present invention to provide a lighting apparatus for a video camera having an automatic switching mechanism triggered by operation of said video camera.

It is another object of the invention to prevent the recording of video images requiring the addition of supplemental lighting for recording quality purposes without the presence of such supplemental lighting.

Still another object of the invention is to provide a remote signal integral with said video camera switching means to permit use of remote supplemental lighting devices having the foregoing desirable characteristics.

These and other objects and advantageous characteristics of the present invention will become apparent from the following detailed description of the present invention.

DETAILED DESCRIPTION OF THE INVENTION

In a first embodiment of the invention, a proximate switching mechanism is provided such that the operation of a video camera, e.g., by the actuation of a record button, also switches on a video lighting apparatus proximately positioned relative to the video camera.

Figure 1:
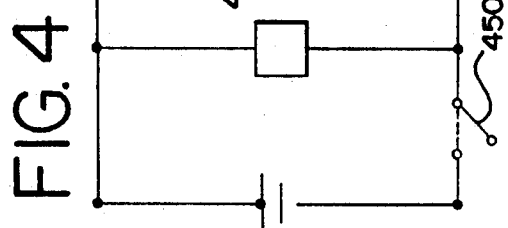
FIG. 1 shows a circuit diagram showing one embodiment of the switching mechanism of the present invention, operated in a proximate location to a video camera.

As shown in FIG. 1, a power supply 110 is provided in a camera operation circuit 120 to power a camera function 130. Such a function may be, for instance, camera motor operation, lens adjustment, exposure control function, and other similar functions. A pilot lamp 140 is provided in camera operation circuit 120 in parallel with motor 130, such that pilot lamp 140 is illuminated when a switch 150 controlling the operation of motor 130 is closed. Illuminated pilot lamp 140 excites photoreceptor 160, which is provided as part of a lighting assembly circuit 170. Photoreceptor 160 may be made, for example, from cadmium sulfide, or any other material which produces an electrical discharge in the presence of light. Photoreceptor 160 and pilot lamp 140 are proximately positioned relative to each other such that a sufficient portion of light from pilot lamp 140 reaches photoreceptor 160 to generate an electrical signal from photoreceptor 160. The electrical signal generated by photoreceptor 160 is transmitted through a lighting assembly circuit 170, where it is used to activate a video lighting apparatus.

Figure 2:
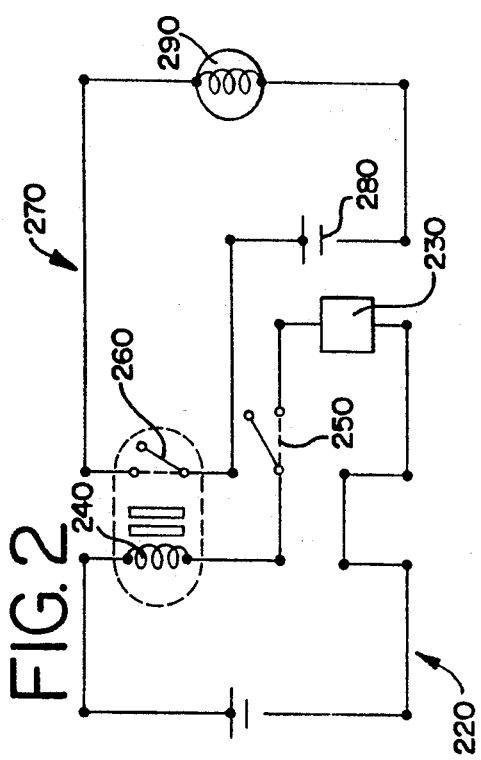
FIG. 2 shows an alternative embodiment of said switching mechanism.

FIG. 2 shows an alternate version of the switching mechanism of the present invention. In the camera operation circuit 220, an electromagnetic coil 240 is provided such that closure of switch 250 to operate camera function 230 results in energization of coil 240. The resulting magnetic field operates to close electromagnetic switch 260 in lighting assembly circuit 270, enabling power to flow from lamp power supply 280 to lamp 290 in the lighting apparatus.

Figure 4:
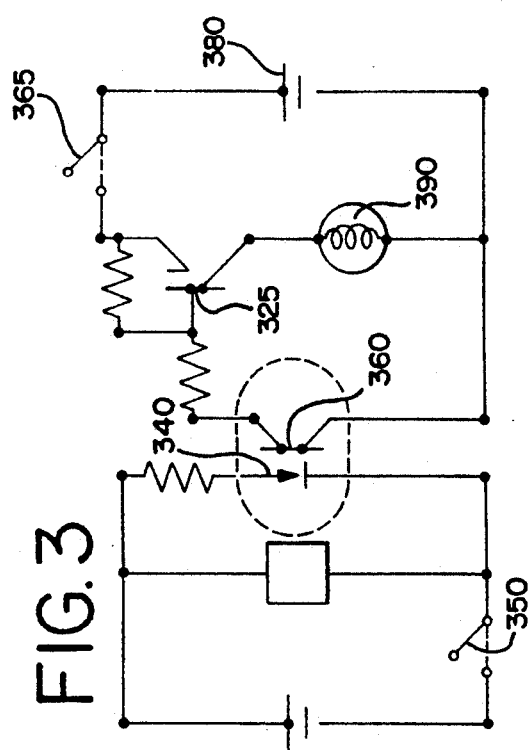
FIG. 4 shows still another alternative embodiment of the switching mechanism.
Figure 3:
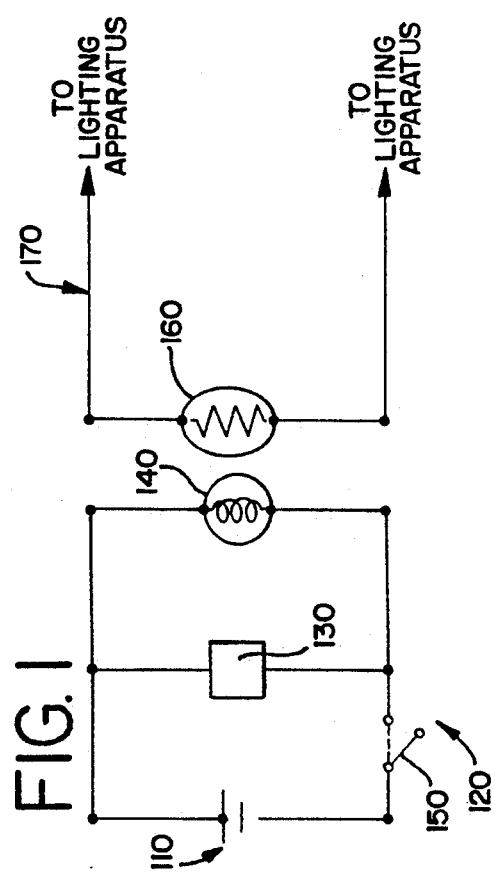
FIG. 3 shows another alternative embodiment of said switching mechanism.

More sophisticated embodiments of the present invention are shown in FIGS. 3 and 4. In FIG. 3, a light emitting diode 340 is substituted for pilot lamp 140 of FIG. 1 in camera operation circuit 320, such that operation of camera operation switch 350 illuminates light emitting diode 340. A light responsive transistor 360 is positioned proximate to light emitting diode 340 to receive light generated therefrom. Before lamp 390 is powered, however, manual lighting switch 365 must be closed; this provides an additional control to the lighting apparatus, preventing waste of resources by requiring manual operation of the lighting apparatus. Closure of manual lighting switch 365 provides collector current to switch transistor 375. Current from switch transistor 375 and light responsive transistor 375 enables sufficient power to flow from lamp power supply 380 to lamp 390.

Similarly, in FIG. 4, camera operation switch 450 and manual lighting switch 465 must both be closed before power is supplied to lamp 490 from lamp power supply 480. Closure of camera operation switch 450 provides collector current to camera operation transistor 440. Current from camera operation transistor 440 switches lamp transistor 460 on, so that power from lamp power supply 480 flows when manual lighting switch 465 is closed.

In each of the embodiments described, the cessation of the signal from the camera operation circuit (e.g., 120), whether from the pilot lamp (140), light emitting diode (340), electromagnetic coil (240), or other means, results in the cessation of power flow through the lighting assembly circuit (e.g., 170). In other words, the switching means of the lighting assembly circuit (e.g., 170) are actuated only during the generation of the signal from the camera operation circuit (e.g., 120). Cessation of the signal results in the shut down of the lighting apparatus.

Figure 11:
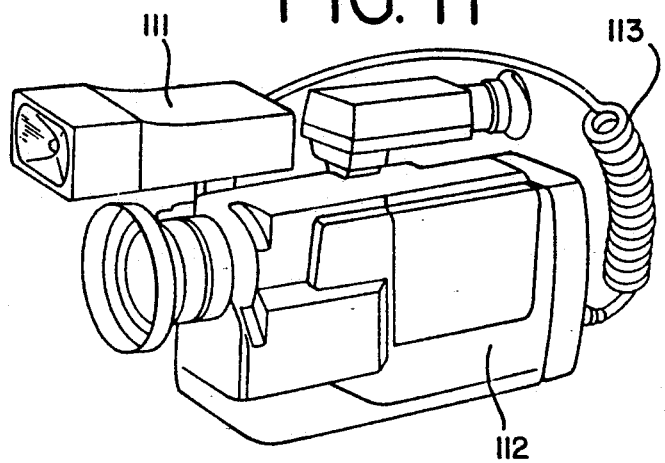
FIGS. 11 through 13 illustrate various examples of configurations of the video camera and lighting apparatus in which the switching mechanism of the present invention may be employed with the lighting apparatus in a proximate position.
Figure 12:
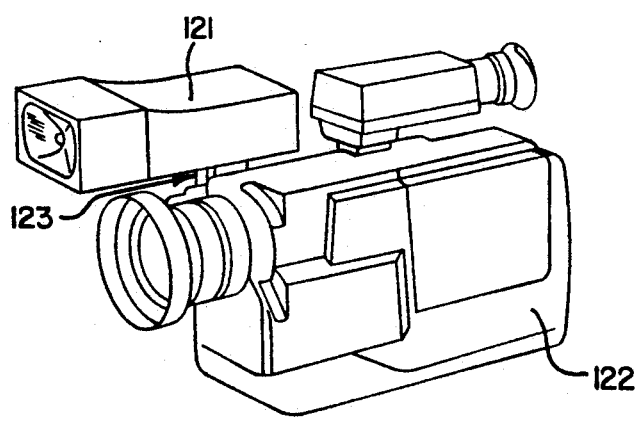
Figure 13:
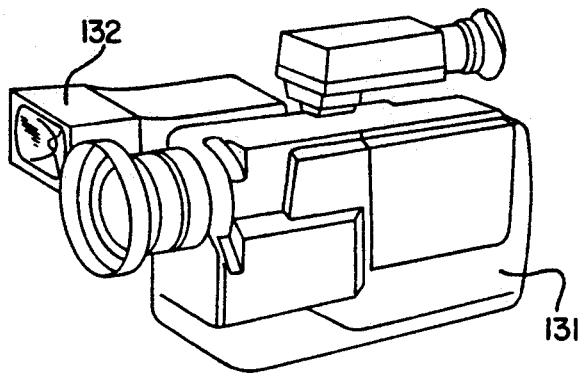

Proximately positioned lighting apparatuses, to which the foregoing is applicable, include devices such as that shown in FIG. 11, where lighting apparatus 111 is connected to camera 112 by a power cable or signalling cable 113, and in FIG. 12, where lighting apparatus 121 is connected to camera 122 by a "hot shoe" socket 123 into which a conductive tab on the lighting apparatus is plugged. FIG. 13 shows a camera 131 having an integral lighting apparatus 132. The automatic switching mechanism of the present invention may be incorporated into each such configuration of camera and lighting apparatus.

Figure 14:
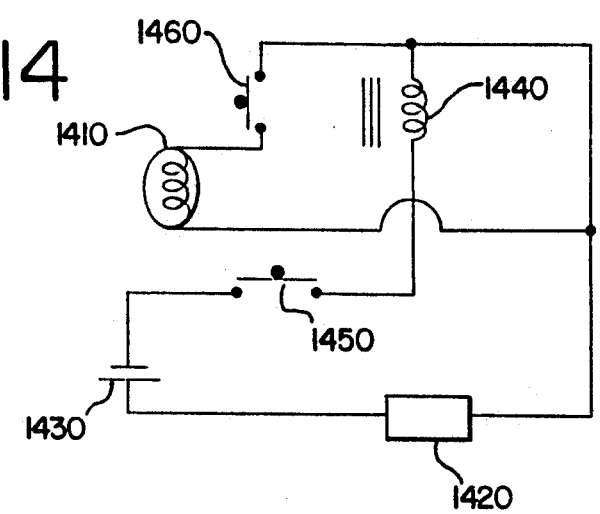
FIG. 14 shows another embodiment of the present invention in which the lighting apparatus and video camera are operated from a single power source.

FIG. 14 shows another embodiment of the present invention, wherein lighting apparatus 1410 and video camera 1420 are both operated from camera power source 1430. Such an arrangement is desirable, since it avoids the needs for an independent power supply for the lighting apparatus, and thereby reduces the size and weight of the lighting apparatus and attached camera. In this embodiment, a switching means 1440, e.g., a magnetic switch, is closed upon operation of video camera power switch 1450. Closure of switch 1440 enables the operation of the camera 1420 and also enables the operation of lighting apparatus 1410. An independent power switch 1460 for lighting apparatus 1420 may be desirably included in the circuit to permit operation of the camera without the lighting apparatus.

Figure 5:
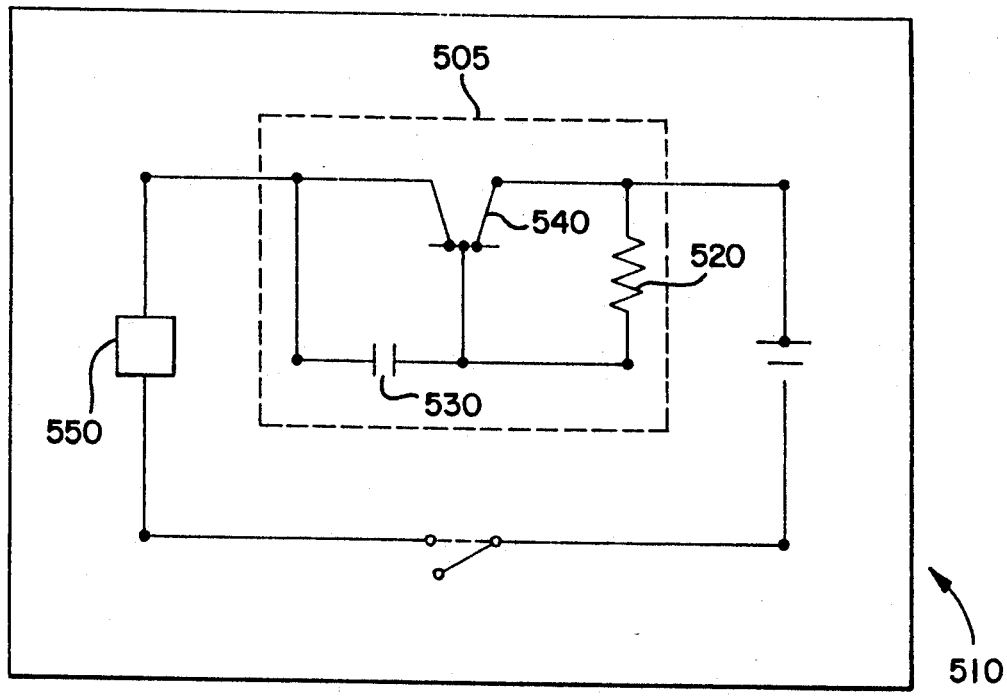
FIG. 5 shows a time delay circuit installed for use with the switching mechanism of the present invention.

It is also desirable to provide a time delay between the triggering of the video lighting apparatus, described in the preceding paragraphs, and the operation of the camera. Such a delay permits the lighting to achieve proper color temperature, to enable recording of accurate color information in the video camera. As shown in FIG. 5, a time delay circuit 505 is provided in camera operation circuit 510 by including a transistor 540, resistor 520 and capacitor 530 in camera operation circuit 520. The voltage drop across resistor 520 results in a delay in activation of transistor 540 until capacitor 530 is sufficiently charged. Charging of capacitor 530 results in sufficient voltage applied to the base of transistor 540 to permit current flow to camera function 550. During this time delay, however, the switching mechanism of the present invention has switched the lighting apparatus on.

Capacitor 530 is selected to have charging characteristics to provide for a time delay sufficient to permit the color temperature to rise so that accurate colors can be recorded.

Figure 6:
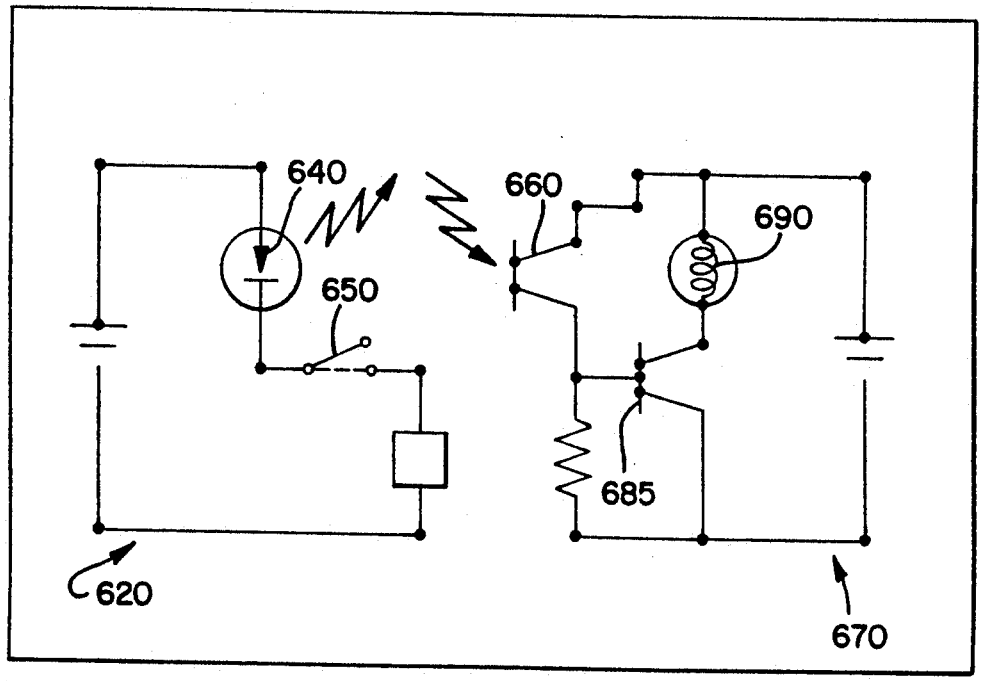
FIG. 6 shows an embodiment of the switching mechanism employed in the operation of a remote supplemental lighting unit.

It is also desirable in some environments to provide a video lighting apparatus in a remote, rather than proximate, location relative to the video camera. As shown in FIGS. 6 though 9, this may be accomplished in several alternative embodiments without interfering with recording of video information. Thus, in FIG. 6, camera operation circuit 620 is provided with an infrared light emitting diode 640 which is illuminated upon closure of camera operation switch 650. The infrared signal produced by the light emitting diode 640 is received by infrared receiving transistor 660 included in the video lighting assembly circuit 670. Reception of the infrared signal permits infrared receiving transistor 660 to emit current, thereby switching video lighting apparatus transistor 685. Once switched, current from transistor 685 powers lamp 690. The use of an infrared signal does not adversely affect the video camera, since the frequency is below the spectrum recorded by the camera.

Figure 7:
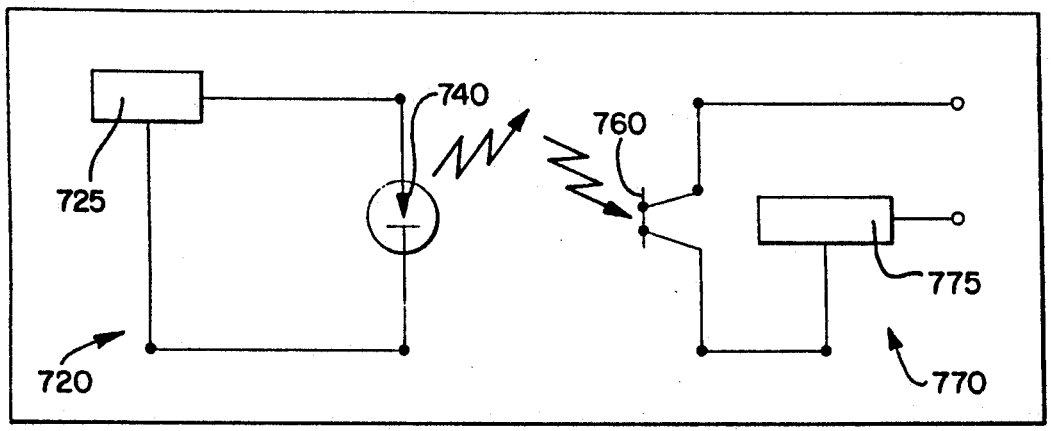
FIGS. 7 through 9 show alternative embodiments of the switching mechanism, including coding means for selective triggering of the lighting apparatus.

In FIG. 7, the foregoing apparatus is modified by addition of an encoding means 725 to camera operation circuit 720 and paired decoding means 775 to lighting assembly circuit 770, restricting the activation of the lighting apparatus to operation only with the camera having the paired coding circuitry. Thus, in FIG. 7, an oscillator 725 is provided in camera operation circuit 720, corresponding to filter 775 in the lighting assembly circuit 720. Oscillator 725 generates a coded signal in the infrared transmission of light emitting diode 740. When this transmission is received by light receiving transistor 760, the signal is decoded by filter 775. Filter 775 is adjusted so that only the specific coded signal of paired oscillator passes through and enable operation of the lighting apparatus.

Figure 8:
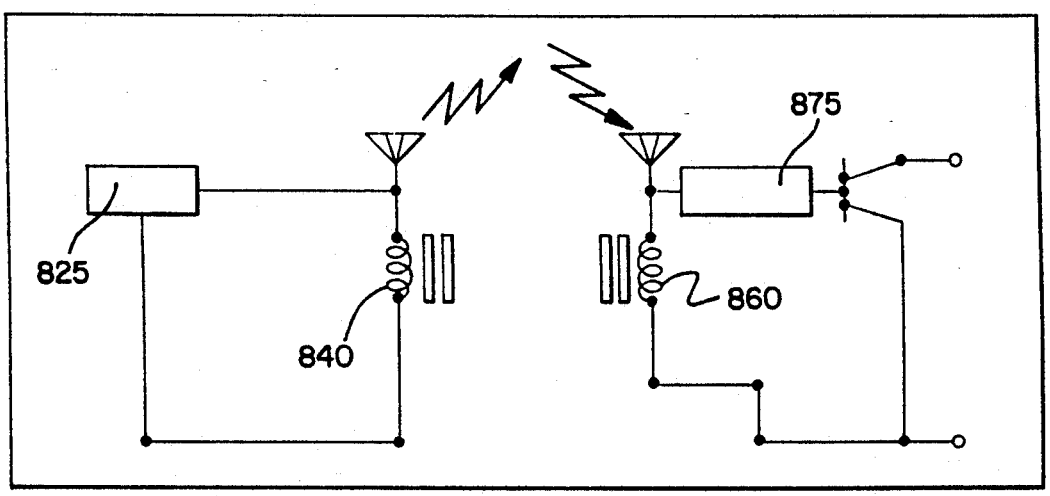
Figure 9:
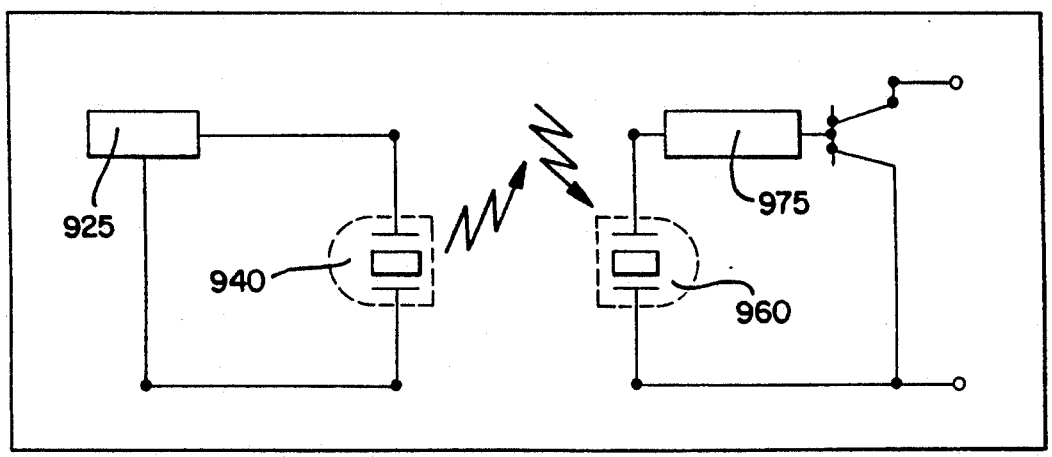

FIG. 8 shows a different embodiment of the same apparatus using a radio signal generated by radio transmitter 840 and received by radio receiver 860, in lieu of an infrared signal. FIG. 9 shows the employment of an ultrasonic signal generated by transmission means 940 and received by receiving means 960, instead of the infrared or radio signals previously described. In each of the embodiments of FIGS. 8 and 9, the operation of oscillators 825 and 925 and filters 875 and 975 are as described with respect to the infrared implementation disclosed in FIG. 6 and above.

Figure 10:
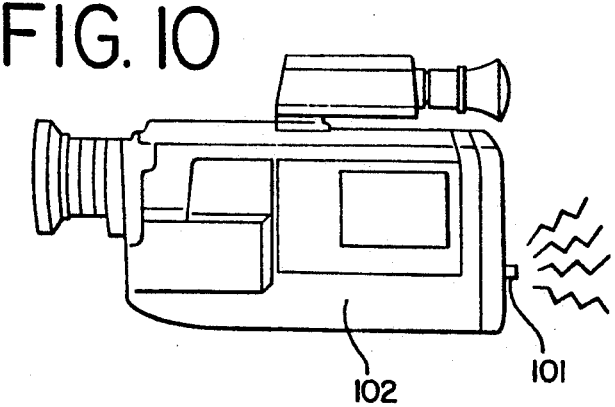
FIG. 10 shows a desirable placement of transmission means in the case where the lighting apparatus is remote.

In the remote embodiments of FIGS. 6-9, it is desirable to place the signal transmission means 101, e.g., the infrared LED, radio signal transmitter or ultrasonic transmitter, on the exterior of a video camera 102, as shown in FIG. 10. Such placement maximizes the quantity of signal transmitted and insures that the signal will be received by the lighting apparatus.

As described above with regard to proximate lighting apparatuses, cessation of the signal from the motor operation circuit results in the cessation of power flow to the lamp in the lighting apparatus.

It is preferable in each of the above embodiments to include, in the camera means, a power detection circuit linked to the operation of the lighting apparatus to determine whether the video camera is operating. This has the desirable advantage of preventing illumination of the lighting apparatus when the camera fails to operate. It may also be employed to prevent illumination of the lighting apparatus when the camera is powered, but not in an operating mode (i.e., initial stages prior to recording).

Figure 15:
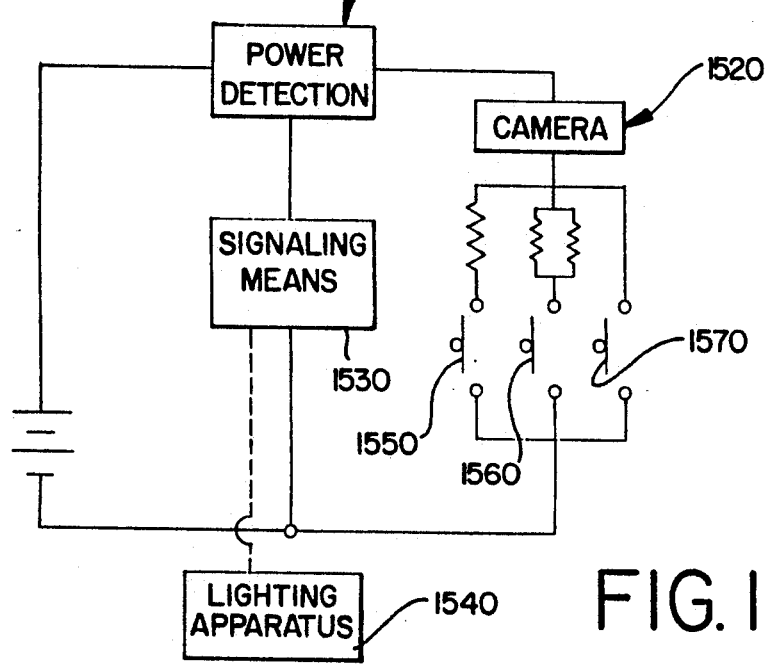
FIGS. 15 and 16 show the present invention in which a power detection circuit is included for preventing operation of the lighting apparatus when the camera is not powered at a predetermined level, or is inoperable.

As shown in FIG. 15, power detection circuit 1510 is placed in series with camera operation circuit 1520. Power detection circuit may take the form of a transistor or phototransistor switch activated by the flow of current through the camera operation circuit 1520; other, similar switching means responsive to the flow of current through the video camera are known to the art and may be similarly employed. If no current is supplied through camera operation circuit 1520, as when the camera is inoperable, power detection circuit 1510 supplies no current to signalling means 1530, thereby preventing illumination of lighting apparatus 1540. Operation of the lighting source is therefore desirably limited to conjoin with the operation of the camera.

Figure 16:
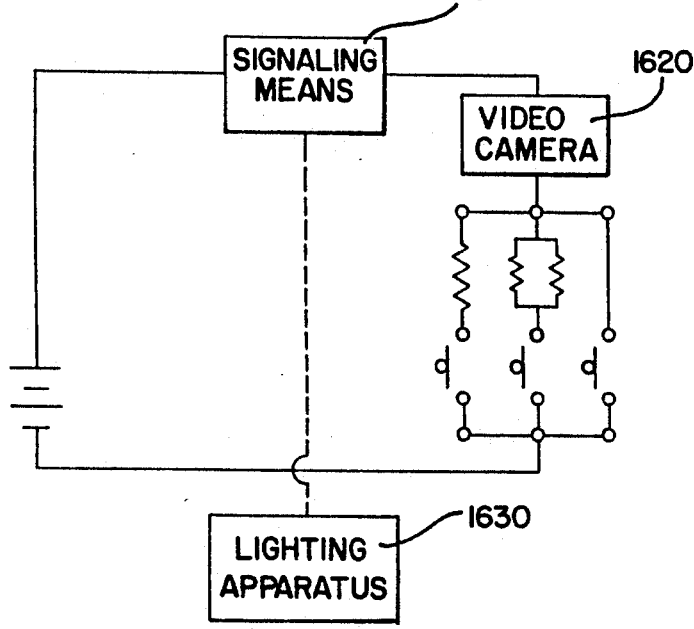

An alternative circuit having the same ability to conjoin the operation of the lighting apparatus to the operation of the camera is shown in FIG. 16. In this embodiment, signalling means 1610 is connected in series to camera operation circuit 1620. Thus, a failure in camera operation circuit 1620 prevent current flow to signalling means 1610, preventing the operation of the signalling means and illumination of the lighting apparatus 1630.

In a preferred embodiment of the present invention, the operation of the video camera is effected by a plurality of switches on the camera body. As shown in FIG. 15, three switches are desirably provided for the operation of the camera. Power switch 1550 is provided to permit a low level of current flow to the various operating parts of the camera, i.e., the recorder, image sensor, and the like. Standby switch 1560 is provided to permit additional current flow to the operating parts of the camera, while record switch 1570 is provided to provide still greater current flow to permit the operation of the camera recording operation. In the preferred embodiment, power detection means 1510, described above, is responsive not only to the existence of current flow from the camera, but to the magnitude of current. Thus, power detection means 1510 may be provided such that the operation of lighting apparatus 1540 is not triggered until the level of power flowing through camera operation circuit 1520 reaches a predetermined magnitude associated with the greater current flow resulting from the closure of the standby and/or record switches 1560 and 1570.

The present invention has been described with respect to certain embodiments and conditions, which are not meant to and should not be construed to limit the invention. Likewise, the drawings appended hereto are not intended to limit the invention to the embodiments illustrated, but are provided to highlight specific embodiments and portions thereof. Those skilled in the art will understand that variations from the embodiments and conditions described herein may be made without departing from the invention as claimed in the appended claims.

What is claimed is:

1. A switching mechanism for a video camera lighting apparatus comprising:
   signalling means activated by actuation of a video camera operation switch for generating a signal, said signalling means being located in a video camera operation circuit;
   receiving means for activating a lighting apparatus upon receiving said signal, said receiving means being located in a lighting apparatus operation circuit;
   said signalling means comprises an electromagnetic coil, and said receiving means comprises an electromagnetic switch actuated in response to current flow in said electromagnetic coil, said electromagnetic coil and said electromagnetic switch placed in proximate relationship to one another;
   wherein a video camera and said signalling means are electrically connected such that the failure of the video camera to operate prevents operation of the lighting apparatus.

2. A switching mechanism for a video camera lighting apparatus comprising:
   signalling means activated by actuation of a video camera operation switch for generating a signal,
   receiving means for activating a lighting apparatus upon receiving said signal;
   means for electrically connecting said video camera and said signalling means such that the failure of the video camera to operate prevents operation of the lighting apparatus; and
   means for delaying the operation of the video camera until sufficient time after the signalling of the lighting apparatus to permit the lighting apparatus to warm to a color temperature accurate for recording color information by a video camera, said means for delaying provided in circuit with said signalling means.

3. The switching mechanism of claim 2, wherein said means for delaying the operation of a video camera comprises a resistor for reducing the voltage applied to a signalling transistor, and a capacitor for increasing said voltage over said time to permit signalling at the end of said time.

4. A switching mechanism for a video camera lighting apparatus comprising:
   signalling means activated by actuation of a video camera operation switch for generating a signal; said signalling means including detection means for detecting the level of load current running through a video camera, whereby said signal is not generated when the level of current is less than a predetermined magnitude;
   receiving means for activating a lighting apparatus upon receiving said signal; and
   means for delaying the operation of the video camera until sufficient time after the signalling of the lighting apparatus to permit the lighting apparatus to warm to a color temperature accurate for recording color information by the video camera, said means for delaying arranged in circuit with said signalling means.

5. A switching mechanism for a video camera lighting apparatus comprising:
  signalling means activated by actuation of a video camera operation switch for generating a signal;
  receiving means for activating a lighting apparatus upon receiving said signal;
  detection means for detecting the level of current running through a video camera, and inhibiting said signal if the level of current is less than a predetermined magnitude; and
  means for delaying the operation of a video camera until sufficient time after the signalling of the lighting apparatus to permit the lighting apparatus to warm to a color temperature accurate for recording color information by a video camera, said means for delaying arranged in circuit with said signalling means.

* * * * *